US012749597B2

(12) United States Patent
Wilson et al.

(10) Patent No.: US 12,749,597 B2
(45) Date of Patent: Sep. 29, 2026

(54) SEMICONDUCTIVE TAPES AND METHODS FOR MAKING THE SAME

(71) Applicant: DelStar Technologies, Inc., Alpharetta, GA (US)

(72) Inventors: Rebecca Wilson, Stalybridge (GB); Geoffrey Henstock, Greater Manchester (GB)

(73) Assignee: Scapa UK Limited (GB)

( * ) Notice: Subject to any disclaimer, the term of this patent is extended or adjusted under 35 U.S.C. 154(b) by 63 days.

(21) Appl. No.: 18/484,366

(22) Filed: Oct. 10, 2023

(65) Prior Publication Data

US 2024/0136089 A1 Apr. 25, 2024
US 2024/0233985 A9 Jul. 11, 2024

Related U.S. Application Data

(60) Provisional application No. 63/417,772, filed on Oct. 20, 2022.

(51) Int. Cl.
*H01B 9/02* (2006.01)

(52) U.S. Cl.
CPC ............. *H01B 9/027* (2013.01); *H01B 9/021* (2013.01)

(58) Field of Classification Search
CPC ....................................................... H01B 9/027
See application file for complete search history.

(56) References Cited

U.S. PATENT DOCUMENTS 3,991,397 A * 11/1976 King .................... H01B 7/0063 252/511
4,090,984 A * 5/1978 Lin ........................ H01B 3/004 252/511
4,956,203 A * 9/1990 Kroupa .................... C08K 3/04 428/407
10,121,570 B2 * 11/2018 Somasiri ................ H01B 3/306
2004/0192525 A1 * 9/2004 Nitta ....................... C08L 53/00 525/240
2011/0240330 A1 * 10/2011 Gervat ................ C08L 23/0884 252/511
2011/0311809 A1 12/2011 Yamaguchi et al.
2016/0268018 A1 9/2016 Sica et al.
2019/0057623 A1 * 2/2019 Magsood .............. B29C 39/003
2024/0128820 A1 * 4/2024 Mabuchi .................. H02K 3/42

FOREIGN PATENT DOCUMENTS

CN 2769268 Y 4/2006
EP 3231404 A1 10/2017
JP 3-266314 * 11/1991

OTHER PUBLICATIONS

International Search Report and Written Opinion; International Application No. PCT/US2023/076504; Apr. 19, 2024.

* cited by examiner

*Primary Examiner* — Chau N Nguyen
(74) *Attorney, Agent, or Firm* — Farber LLC

(57) ABSTRACT

Semiconductive tapes for use with electric cables, such as high voltage power cables, and methods for manufacturing such tapes, are provided. A semiconductive tape comprises a first layer comprising a fabric and a second layer in contact with the first layer. The second layer comprises an activated carbon or carbon black. The semiconductive tapes have increased friction while still maintaining sufficient electrical conductivity for use as wrappings for electric power cables, thereby improving the manufacturing process and reducing the overall cost of production.

16 Claims, 3 Drawing Sheets

SEMICONDUCTIVE TAPES AND METHODS FOR MAKING THE SAME

CROSS-REFERENCE TO RELATED APPLICATIONS

This application claims the benefit of U.S. Provisional Application Ser. No. 63/417,772, filed Oct. 20, 2022, the complete disclosure of which is incorporated herein by reference for all purposes.

TECHNICAL FIELD

This description generally relates to semiconductive tapes and more particularly to semiconductive tapes for use with electric cables, such as overhead, underwater or underground power cables.

BACKGROUND

High voltage electric power cables are used to transmit electric power with medium or high voltage. The cables normally comprise a conductor and a polymeric insulation system that surrounds the conductor. Electric power cables that can be buried into the ground are called land cables. Electric power cables that can be buried into a sea bed which can freely extend between two fixing points in sea water are called submarine, sea water or underwater power cables. Underwater power cables are used today in an increasing amount due to the increased need of power transfer from offshore energy sources, including offshore renewable energy plants, such as wind power plants. Also the length for power transfer cables is increasing since there is a need to interconnect different regional electrical transmission networks to allow global trading of energy. Areas where energy is on the other hand needed and on the other hand produced may also be remote from each other which further increases a need for safe power transfer.

Semi-conductive cable tapes are used for many bedding, binding, separating, jointing and identification applications in heavy duty power, multi-core and communication cables. Semi-conductive cable tape offers many physical and electrical properties for a wide variety of cable manufacturing applications.

Semi-conductive cable tapes are typically made with either a nylon, polyester or woven PET substrate coated on one or both sides with a cross-linked acrylic semi-conductive compound. These tapes help to equalize the field current around the power conductor or core, and ensure electrical contact with the earthing system. This reduces the electrical stress on the insulation material and enhances performance. They can also be used to prevent electrolytic corrosion of metallic armor layers in high voltage cables.

While these semi-conductive cable tapes have proven useful, they also suffer from drawbacks. For example, the acrylic semi-conductive compounds typically used for these tapes generally have a relatively low coefficient of friction, which makes them slippery, particularly during the process of manufacturing the cable. This creates challenges in production and can increase the overall cost of manufacturing the cables.

Higher friction tapes, such as cloth adhesive tapes or PVC electrical tapes, have a higher coefficient of friction than standard semiconductive cable tapes. However, these types of tapes typically do not possess sufficient electrical conductivity to be used for as a wrapping for electric power cables.

What is needed, therefore, are semi-conductive cable tapes that have increased friction to improve the manufacturing process, while still maintaining sufficient electrical conductivity for use with electric power cables.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

Semiconductive tapes and methods for manufacturing such tapes are provided. Semiconductive tapes are also provided for use in bedding, binding, separating, joining and/or identification applications in heavy duty power, multi-core and communication cables. The semiconductive tapes have increased friction while still maintaining sufficient electrical conductivity for use as, for example, wrappings for electric power cables such as high or medium voltage overhead, underwater and/or underground power cables used to transmit electric power with medium or high voltage. This improves the cable manufacturing process and reducing the overall cost of production.

In one aspect, a semiconductive tape comprises a first layer comprising a fabric and a second layer in contact with the first layer. The second layer comprises an activated carbon or carbon black. Applicant has discovered that the activated carbon and/or carbon black increases the static and dynamic coefficients of friction of the tape, while maintaining sufficient electrical conductivity for use as, for example a wrapping for high voltage electrical cables.

In various embodiments, the tape further includes a third layer comprising an activated carbon or carbon black. The second and third layers are preferably bonded to opposing surfaces of the first layer.

In various embodiments, the second and/or third layers comprise a fluid, such as water, and the solid content of the second layer is about 30% to about 60%, preferably about 45%. Applicant has discovered that a solid content greater than about 60% results in an unstable mixture, whereas a solid content less than about 30% reduces the conductivity of the layer such that the overall tape is not sufficiently conductive to function as a cable wrapping.

In various embodiments, the second and/or third layer(s) comprise carbon black. The carbon black may be substantially or entirely solid and may comprise mixed pigments, or substantially the same pigments. The carbon black may be hydrophobic. Hydrophobic carbon black can be transported by itself, i.e., without blending it with an aqueous solution, such as water. This increases the solid content of the final mix used in production of the second and/or third layers.

In various embodiments, the carbon black is about 6% to about 35% by weight of the second and/or third layer(s), preferably about 24.5% by weight of the second layer. Applicant has discovered that mixture with carbon black greater than about 35% by weight results in an unstable mixture, whereas a mixture with carbon black less than about 6% reduces the conductivity of the layer such that the overall tape is not sufficiently conductive to function as a cable wrapping.

The second and/or third layers may further comprise an electrically insulating polymer, such as an acrylic copolymer dispersed in water. The acrylic copolymer may be self-crosslinking and may function to bond the second and/or third layers to the first layer.

Suitable materials for the fabric include, but are not limited to, nylon, polyester, synthetic fibers, natural fibers and synthetic polymers. In certain embodiments, the fabric comprises nylon or polyester, or a combination thereof.

The second and/or third layers further comprise water in about 25% to about 30% by weight of the second layer. The second and/or third layers may comprise a dispersant, such as sodium polyacrylate or the like. The second and/or third layers may further comprise a suspending agent, such as polysaccharide or the like. The second and/or third layers may comprise an anti-foaming agent, such as mineral oil or the like. The second and/or third layers may comprise a thickener, such as NaOH and other stabilizers.

The second and/or third layers may further comprise a second polymer. The second polymer may be similar to, or substantially different from, the first polymer. Suitable materials for the second polymer include an acrylic ester-styrene copolymer or the like.

In certain embodiments, the tape has substantially the same, or greater, friction as conventional protective nonconductive tapes. In one such embodiment, the tape has a coefficient of static friction of at least about 1.00, preferably at least about 1.25, more preferably between about 1.4 and 2.0 The tape may have a coefficient or dynamic friction of at least about 0.7, preferably at least about 0.8.

In embodiments, the tape has sufficiently electrical conductivity to function as a wrapping for high voltage, or other, cables. In one such embodiment, the tape is configured to be positioned above the core electrical conductor of the cable. In another embodiment, the tape is configured to be positioned over the outer wrapping of the cable. In other embodiments, the tape may be placed around one of the other layers of the cable, such as the inner semiconductive layer, the insulation, the outer semiconductive layer, the wire screen, the bedding and binding layers or the over sheath (jacket) of the cable.

The tape preferably has a volume resistivity of less than or equal to about 1 million (Ω/cm), more preferably less than or equal to about 100 (Ω/cm). The tape also preferably has a Through/Res of ≤500 (Ω) and a Surface/Res of ≤10000 (Ω/sq).

In another aspect, an electric cable is provided that includes a wrapping tape. The cable may comprise high or medium voltage power cable. The cable may be configured for use as an overhead, underwater and/or underground power cable. The wrapping tape comprises a first layer of fabric and a second layer comprising an activated carbon or carbon black.

In another aspect, a method of making a semiconductive tape comprising providing a first layer of fabric and a second layer comprising an activated carbon or carbon black. The second layer is bonded to a surface of the first layer to form a semiconductive tape with increased friction and sufficient electrical conductivity for use as a cable wrapping for electrical cables.

In embodiments, the second layer is formed from a mixture of the activated carbon or carbon black and a polymer and the mixture is then applied to a surface of the first layer. The polymer preferably comprises a material that facilitates bonding of the activated carbon or carbon black to the first layer.

The second layer preferably comprises a sufficient water content to apply the layer as a substantially fluid mixture onto the first layer. The first layer may be stretched along a frame, winder, rolling machine or similar device to provide a substantially flat or level surface for application of the second layer.

In embodiments, the first and second layers are dried to remove the water content and/or to facilitate bonding of the second layer to the first layer. The second layer may further comprise a polymer, such as an acrylic copolymer dispersed in water. The method may further comprise cross-linking the acrylic copolymer to bond the second layer to the first layer.

In embodiments, the method further comprises forming a third layer comprising an activated carbon or carbon black and bonding the third layer to the first layer. The second and third layers may be bonded to opposing surfaces of the first layer.

The recitation herein of desirable objects which are met by various embodiments of the present description is not meant to imply or suggest that any or all of these objects are present as essential features, either individually or collectively, in the most general embodiment of the present description or in any of its more specific embodiments.

DETAILED DESCRIPTION

This description and the accompanying drawings illustrate exemplary embodiments and should not be taken as limiting, with the claims defining the scope of the present description, including equivalents. Various mechanical, compositional, structural, and operational changes may be made without departing from the scope of this description and the claims, including equivalents. In some instances, well-known structures and techniques have not been shown or described in detail so as not to obscure the description. Like numbers in two or more figures represent the same or similar elements. Furthermore, elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment. Moreover, the depictions herein are for illustrative purposes only and do not necessarily reflect the actual shape, size, or dimensions of the system or illustrated components.

It is noted that, as used in this specification and the appended claims, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items.

Except as otherwise noted, any quantitative values are approximate whether the word "about" or "approximately"

or the like are stated or not. The materials, methods, and examples described herein are illustrative only and not intended to be limiting.

Semiconductive tapes and methods for manufacturing such tapes are provided. Semiconductive tapes are also provided for use with electrical cables, such as overhead, underwater or underground power cables. The semiconductive tapes have increased friction while still maintaining sufficient electrical conductivity for use as wrappings for electrical power cables, thereby improving the manufacturing process and reducing the overall cost of production.

Figure 3:
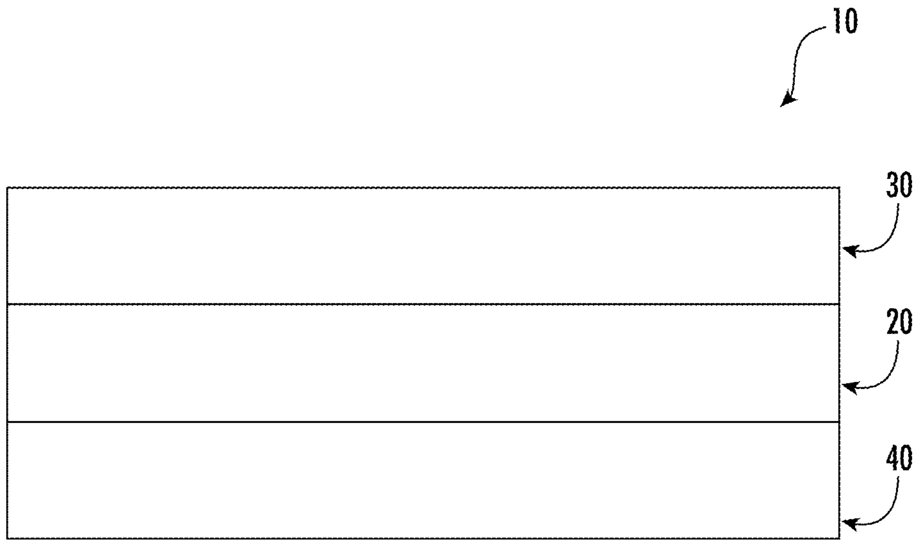
FIG. 3 is a schematic illustration of a semiconductive tape.

In various embodiments, the semiconductive tapes described herein comprise a fabric and an activated carbon or carbon black material. The fabric may be mixed with the carbon material to form a single layer. Alternatively, the tape may be formed as separate layers that are bonded together. In one embodiment shown in FIG. 3, the tape 10 comprises a first fabric layer 20 bonded to a second layer 30 comprising activated carbon or carbon black.

The fabric may comprise any material suitable for use with tapes, such as semiconductive tapes. Suitable fabrics include, but are not limited to, nylon, polyester, synthetic fibers, natural fibers and synthetic polymers. In certain embodiments, the fabric comprises nylon or polyester, or a combination thereof.

In certain embodiments, the tape 10 further includes a third layer 40 comprising an activated carbon or carbon black. The second and third layers 30, 40 are preferably bonded to opposing surfaces of the first layer 20.

The second and/or third layer(s) comprise carbon black or an activated carbon, such as a powdered activated carbon, granulated activated carbon, pelletized activated carbon, activated carbon cloth, wood-based activate carbons and the like. Suitable carbon blacks may include acetylene black, channel black, furnace black, lamp black, thermal black or combinations thereof. The carbon black may contain mixed pigments, or substantially the same pigment.

Activated carbon, or charcoal filters, are typically made from raw organic materials that are substantially high in carbon. Heat, in the absence of oxygen, may be used to increase or activate the surface area of the carbon. Suitable activated carbon materials include bamboo, coconut husks, willow peat, wood, coir, lignite, coal, petroleum, soybeans hulls, nutshells, sugarcane bagasse and combinations thereof.

In certain embodiments, the carbon black is substantially hydrophobic such that it can be transported by itself, i.e., without blending with aqueous solutions, such as water. This increases the solid content of the final mix used in production of the second layer.

In one embodiment, the carbon black is 100% solid and preferably comprises about 6% to about 35% by weight of the second layer, preferably about 24.5% by weight of the second layer.

The second and/or third layer(s) may further comprise a polymer that facilitates bonding to the first layer. Suitable polymers for the second layer include acrylic copolymers, such as sodium polyacrylate, polyvinyl acetate, polyacrylamide, latex and combinations thereof. The copolymer may be in a stable emulsion or dispersion of polymer microparticles in an aqueous solution.

In certain embodiments, the polymer is self-crosslinking such that it "sets" when dried and the aqueous solution, e.g., water, is substantially removed from the mixture. This setting facilitates the bond between the carbon black and the first layer. The polymer is about 40% to about 50% solid, preferably about 45%; and comprises about 35% to about 50%, preferably about 40.9% by weight of the overall mixture.

The second and/or third layer(s) may include a second polymer that also facilitates bonding to the first layer. The second polymer may be a similar, or substantially different, material as the first polymer. Suitable second polymers for the second layer include acrylic copolymers, such as sodium polyacrylate, polyvinyl acetate, polyacrylaminde, acrylic ester-styrene, latex and combinations thereof. The copolymer may be in a stable emulsion or dispersion of polymer microparticles in an aqueous solution. The second polymer is about 40% to about 60% solid, preferably about 50% solid, and comprises about 2% to about 5%, preferably about 3.4%, by weight of the overall mixture.

The second and/or third layer(s) may further comprise a dispersant to promote the dissolution of surfactants and additives into the mixture. Suitable dispersants include polyvinyl pyrrolidone (PVP), sodium hexameta phosphate (SUP), the sodium salt of EDTA, sodium dodecyl sulfonate (SDS), sodium dodecyl benzene sulfonate (SDBS), sodium polyacrylate and the like. In one embodiment, the dispersant comprises a sodium polyacrylate known by the trade name RHEOSOLVE and manufactured by Coatex. The dispersant is about 40% to about 60% solid, preferably about 45% solid, and comprises about 0.1% to about 0.5%, preferably about 0.4%, by weight of the overall mixture.

The second and/or third layer(s) may further comprise a suspending agent to promote particle suspension or dispersion and reduce sedimentation. Suitable suspending agents include aqueous biological polymers, such as methylcellulose (MC), sodium carboxymethycellulose (CMC), hydroxypropylmethylcellulose (HPMC), polysaccharide and the like. In one embodiment, the dispersant comprises a polysaccharide known by the trade name Xanthan Gum and manufactured by TER Chemicals. The suspending agent is preferably 100% solid, and comprises about 0.5% to about 2%, preferably about 1%, by weight of the overall mixture.

The second and/or third layer(s) may further comprise an antifoam agent to lower the surface tension of the mixture. Suitable antifoam agents include aqueous certain alcohols (cetostearyl alcohol), insoluble oils (castor oil), stearates, polydimethylsiloxanes and other silicone derivatives, ether, glycols, mineral oils and the like. In one embodiment, the antifoam agent comprises a mineral oil known by the trade name DISPELAIR and manufactured by Blackburn Chemicals, LTD. The antifoam agent is preferably about 1% to about 100% solid, and comprises about 0.05% to about 0.22%, preferably about 0.1%, by weight of the overall mixture.

The second and/or third layer(s) may further comprise a thickener to increase the overall viscosity of the mixture. Suitable thickeners include starches, gelatins, acacin, pectin, agar-agar, NaOH, stabilizers and the like. The thickener is about 10% to about 20% solid, preferably about 17% and comprises about 0.5% to about 1%, preferably about 0.8%, by weight of the overall mixture.

The second and/or third layer(s) may further comprise an aqueous solution, such as water, to decrease the overall solid content of the second layer. In one embodiment, the water comprises about 20% to about 40% by weight of the overall mixture, preferably about 25% to 30%, and more preferably about 28.9%.

The second and/or third layer(s) may comprise other materials, such as defoamers, bactericides, fungicides, sequestrants and the like.

The overall solid content of the second and/or third layer(s) is preferably about 30% to about 60%, preferably about 45%. Applicant has discovered that a solid content greater than about 60% results in an unstable mixture, whereas a solid content less than about 30% reduces the conductivity of the layer such that the overall tape is not sufficiently conductive to function as a cable wrapping.

The tape preferably has electrically conductive properties suitable for use as a cable wrapping. The tape preferably has a volume resistivity of about 1 million (Ω/cm), more preferably less than or equal to about 100 (Ω/cm). The tape also preferably has a Through/Res of ≤500 (Ω) and a Surface/Res of ≤10000 (Ω/sq).

The tape may be positioned above the conductor of the cable or it may be positioned over one of the other layers of the cable, such as the inner semiconductive layer, the insulation, the outer semiconductive layer, the wire screen, the bedding and binding layers or the over sheath (jacket) of the cable. In one embodiment, the tape is positioned on the outer wrapping of the cable and beneath the final plastic sheath component.

Examples

Applicant tested the friction of a tape with two layers of the mixture described above adhered to a fabric (the "high-friction semiconductive or HFS tape"). The layers were bonded to opposing surfaces of the fabric. Applicant compared the results of these tests with two conventional tapes: (1) a conventional protective tape known by its tradename CT50/113 and sold by Scapa UK, Ltd; and (2) a conventional semiconductor tape known by its tradename SC36/65 and also sold by Scapa UK, Ltd. Applicant conducted tests on 11 different samples of the SC36/65 tape, 5 different samples of the CT50/113 protective tape and 8 different samples of the tape described herein.

Each sample was prepared by cutting it into a suitable size and placing it on a test bed ensuring that the sample was as smooth as possible (i.e., by placing clips or tapes on either side of the sample). A Testometric machine, friction apparatus (i.e., a sled, weight and cable) and load cell 2 kgf were used to test the friction of each sample. The sled was pulled along the test bed at a speed of about 100 mm/min and the friction was recorded on the Testometric machine.

Figure 1:
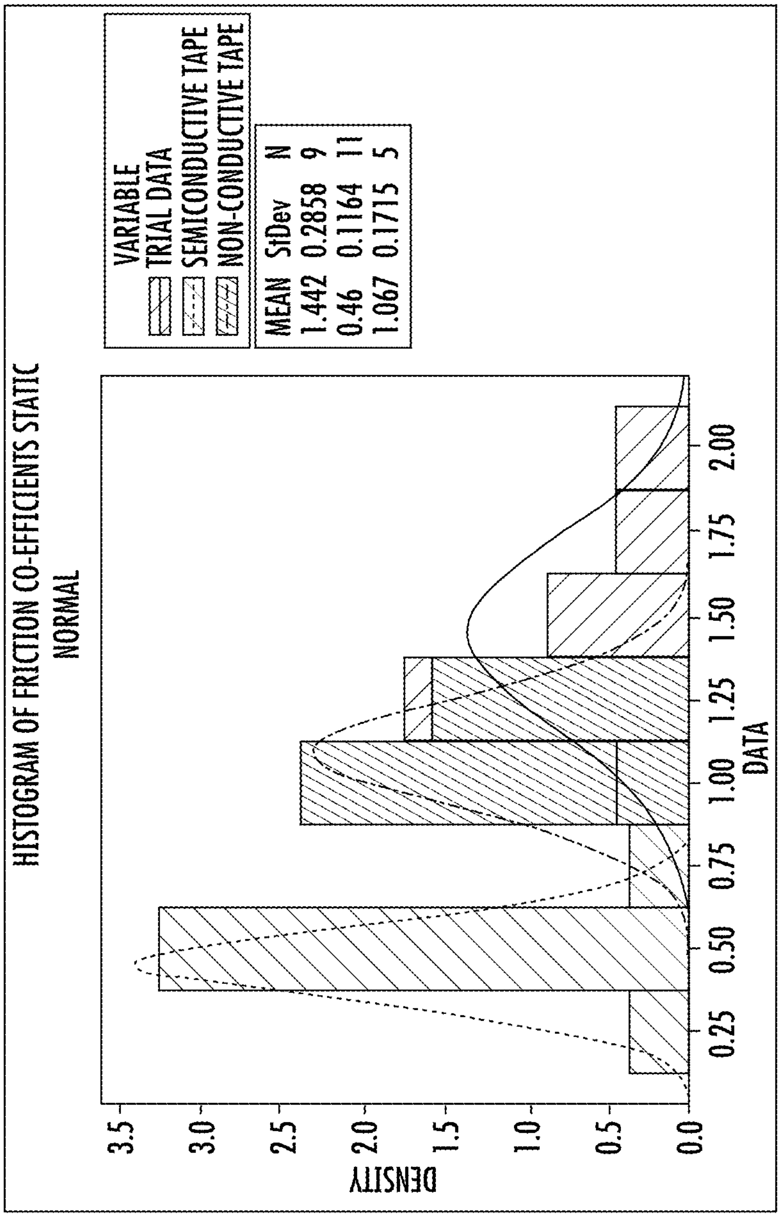
FIG. 1 is a table comparing the coefficient of static friction of the tapes described herein with prior art tapes.

As shown in FIG. 1, the HFS tape described herein had a higher coefficient of static friction than the two conventional tapes. The average coefficient of static friction for the HFS tape was 1.442, whereas the conventional protective tape only had an average coefficient of static friction of 1.087 and the conventional semiconductive tape had an average coefficient of static friction of 0.46. In addition, the HFS tape had electrical conductivity properties substantially the same as the semiconductive tape.

Figure 2:
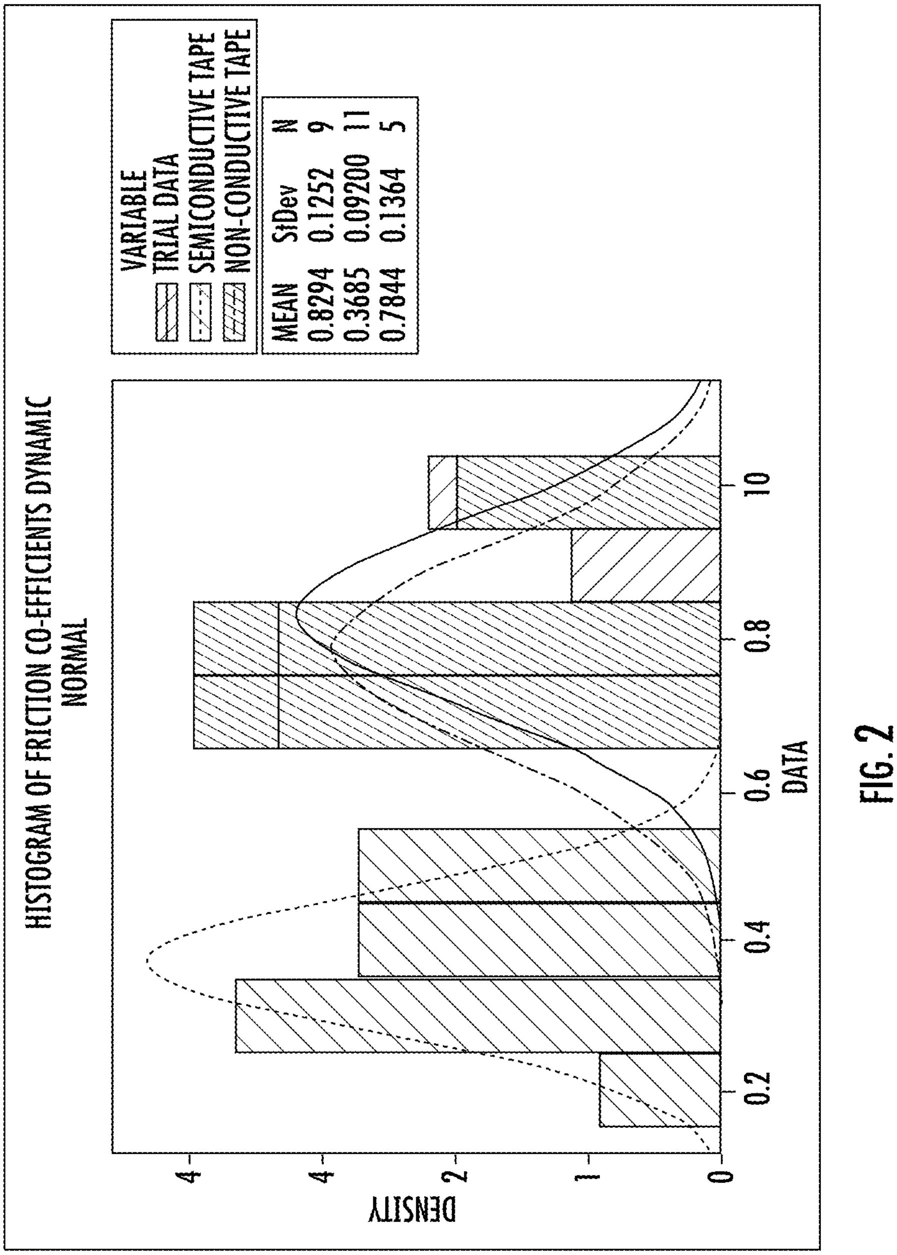
FIG. 2 is a table comparing the coefficient of dynamic friction of the tapes described herein with prior art tapes.

As shown in FIG. 2, the HFS tape described herein also had a higher coefficient of dynamic friction than the conventional tapes. The average coefficient of dynamic friction for the HFS tape was 0.8294, whereas the protective tape had an average coefficient of static friction of 0.7844 and the semiconductive tape only had an average coefficient of static friction of 0.3685.

Thus, the HFS tape as described herein contains substantially the same electrical conductivity properties as the conventional semiconductive tape, while having a higher friction than both the protective and semiconductive tapes.

The semiconductor tapes described herein are manufactured by forming a first layer comprising a fabric and forming a second layer comprising an activated carbon or carbon black. The second layer is bonded to a surface of the first layer to form the semiconductive tape.

The second layer is formed from a mixture of the activated carbon or carbon black and at least one polymer and the mixture is then applied to a surface of the first layer. The mixture preferably comprises the ingredients described above with an overall solid content of about 30% to about 60%, preferably about 45%. The second layer preferably comprises a sufficient water content to apply the layer as a substantially liquid layer onto the first layer. The first layer may be stretched along a frame, winder, rolling machine or similar device to provide a flat or level surface for application of the second layer.

The first and second layers are dried to remove the water content and/or to facilitate bonding of the second layer to the first layer. The method may further comprise cross-linking the acrylic copolymer to bond the second layer to the first layer.

In an exemplary embodiment, the fabric layer is stretched onto a frame such that the edges are held. The frame may comprise a stenter or a similar machine. The fluid carbon black mixture is applied to the fabric through pipes, tubes, nozzles or other conduits, which are positioned such that the fluid mixture is delivered directly onto the fabric on the stenter. The mixture is then leveled or flattened with blades or other suitable leveling devices until it is substantially flat (e.g., similar to screen printing). The thickness and weight of the mixture will depend on the specific application for the tape.

The fabric layer and the mixture are then passed through a series of drying devices, such as ovens, to remove substantially all of the water from the mixture and to set the mix. The mix is preferably set by cross-linking the polymer(s) within the mixture under heat, which causes the mixture to bond to the fabric layer. In certain embodiments, the mixture is cured at about 150 degrees Celsius, although the specific temperature will depend on the specific self-crosslinking polymer used in the mixture.

In embodiments, the tape is then rewound and brought back to the stenter with its opposing side facing the pipes or conduits. The carbon black based mixture is then applied to the opposing side similar to the method described above. This second layer of mixture is then dried and bonded to the fabric layer through the ovens such that a tape having first and second layers of the mixture on opposing sides of the fabric is formed.

Alternatively, the fabric may be dipped into a liquid bath of the mixture, which would coat both sides of the fabric simultaneously. In this embodiment, the mixture-coated fabric would then be squeezed through two rollers or similar devices to level or flatten the mixture before it is dried and cured.

While the devices, systems and methods have been described in detail herein in accordance with certain preferred embodiments thereof, many modifications and changes therein may be effected by those skilled in the art. Accordingly, the foregoing description should not be construed to be limited thereby but should be construed to include such aforementioned obvious variations and be limited only by the spirit and scope of the following claims.

For example, in a first aspect, a first embodiment is a semiconductive tape comprising a first layer comprising a fabric and a second layer in contact with the first layer. The second layer comprises a polymer and an activated carbon or carbon black.

A second embodiment is the first embodiment, wherein the second layer comprises carbon black.

A $3^{rd}$ embodiment is any combination of the first 2 embodiments, wherein the polymer comprises an electrically insulating material.

A $4^{th}$ embodiment is any combination of the first 3 embodiments, wherein the polymer comprises an acrylic copolymer dispersed in water.

A $5^{th}$ embodiment is any combination of the first 4 embodiments, wherein the carbon black is hydrophobic.

A $6^{th}$ embodiment is any combination of the first 5 embodiments, further comprising a third layer comprising a polymer and an activated carbon or carbon black, wherein the first layer is positioned between the second and third layers.

A $7^{th}$ embodiment is any combination of the first 6 embodiments, wherein the fabric comprises a material selected from the group consisting of nylon, polyester, synthetic fibers, natural fibers and synthetic polymers.

An $8^{th}$ embodiment is any combination of the first 7 embodiments, wherein a solid content of the second layer is about 30% to about 60%.

A $9^{th}$ embodiment is any combination of the first 8 embodiments, wherein the solid content is about 45%.

A $10^{th}$ embodiment is any combination of the first 9 embodiments, wherein the carbon black is about 6% to about 35% by weight of the second layer.

An $11^{th}$ embodiment is any combination of the first 10 embodiments, wherein the carbon black is about 24.5% by weight of the second layer.

A $12^{th}$ embodiment is any combination of the first 11 embodiments, wherein the carbon black is 100% solid.

A $13^{th}$ embodiment is any combination of the first 12 embodiments, wherein the second layer further comprises water in about 25% to about 30% by weight of the second layer.

A $14^{th}$ embodiment is any combination of the first 13 embodiments, wherein the second layer further comprises a dispersant.

A $15^{th}$ embodiment is any combination of the first 14 embodiments, wherein the second layer further comprises a suspending agent.

A $16^{th}$ embodiment is any combination of the first 15 embodiments, wherein the second layer further comprises an aqueous dispersion of an acrylic ester-styrene copolymer.

A $17^{th}$ embodiment is any combination of the first 16 embodiments, wherein the second layer further comprises an anti-foaming agent.

An $18^{th}$ embodiment is any combination of the first 17 embodiments, wherein the second layer further comprises a thickener.

In another aspect, an electric cable is providing including the tape of any combination of the first 18 embodiments.

In another aspect, a first embodiment is a semiconductive tape for use with an electrical cable. The tape comprises a fabric and an activated carbon or carbon black. The tape has a resistance of less than or equal to about 1 million (Ω/cm), and a coefficient of static friction of at least about 1.00.

A second embodiment is the first embodiment, wherein the resistance is less than or equal to about 100 (Ω/cm).

A third embodiment is any combination of the first 2 embodiments, wherein the coefficient of static friction is at least about 1.25.

A $4^{th}$ embodiment is any combination of the first 3 embodiments, wherein the coefficient of static friction is about 1.4 to about 1.5.

A $5^{th}$ embodiment is any combination of the first 4 embodiments, wherein the tape has a coefficient of dynamic friction of at least about 0.7.

A $6^{th}$ embodiment is any combination of the first 5 embodiments, wherein the coefficient of dynamic friction is at least about 0.8.

A $7^{th}$ embodiment is any combination of the first 6 embodiments, wherein the tape comprises carbon black.

An $8^{th}$ embodiment is any combination of the first 7 embodiments, wherein the carbon black is substantially solid.

A $9^{th}$ embodiment is any combination of the first 8 embodiments, wherein further comprising an acrylic copolymer dispersed in water.

A $10^{th}$ embodiment is any combination of the first 9 embodiments, wherein the carbon black is hydrophobic.

An $11^{th}$ embodiment is any combination of the first 10 embodiments, wherein the acrylic copolymer and the carbon black are mixed together to form a mixture.

A $12^{th}$ embodiment is any combination of the first 11 embodiments, wherein a solid content of the mixture is about 30% to about 60%.

A $13^{th}$ embodiment is any combination of the first 12 embodiments, wherein the solid content is about 45%.

A $14^{th}$ embodiment is any combination of the first 13 embodiments, wherein the carbon black is about 6% to about 35% by weight of the mixture.

A $15^{th}$ embodiment is any combination of the first 14 embodiments, wherein the carbon black is about 24.5% by weight of the mixture.

In another aspect, an electric cable is providing comprising the tape of any combination of the first 14 embodiments.

In another aspect, a first embodiment is a method of making a semiconductive tape. The method comprises forming a first layer comprising a fabric, forming a second layer comprising an activated carbon or carbon black and bonding the first layer to the second layer.

A second embodiment is the first embodiment, further comprising forming a mixture of the activated carbon or carbon black and a polymer and applying the mixture to a surface of the first layer.

A third embodiment is any combination of the first 2 embodiments, further comprising forming a third layer comprising an activated carbon or carbon black and bonding the third layer to the first layer.

A $4^{th}$ embodiment is any combination of the first 3 embodiments, wherein the first layer comprises a first surface and a second surface opposite the first surface, wherein the second layer is bonded to the first surface and the third layer is bonded to the second surface.

A $5^{th}$ embodiment is any combination of the first 4 embodiments, wherein the polymer comprises an acrylic copolymer dispersed in water.

A $6^{th}$ embodiment is any combination of the first 5 embodiments, further comprising cross-linking the acrylic copolymer to bond the second layer to the first layer.

A $7^{th}$ embodiment is any combination of the first 6 embodiments, wherein the second layer comprises carbon black.

An $8^{th}$ embodiment is any combination of the first 7 embodiments, wherein the carbon black is hydrophobic.

A $9^{th}$ embodiment is any combination of the first 8 embodiments, wherein a solid content of the second layer is about 30% to about 60%.

A $10^{th}$ embodiment is any combination of the first 9 embodiments, wherein the solid content is about 45%.

An $11^{th}$ embodiment is any combination of the first 10 embodiments, wherein the carbon black is about 6% to about 35% by weight of the second layer.

A 12th embodiment is any combination of the first 11 embodiments, wherein the carbon black is about 24.5% by weight of the second layer.

A 13th embodiment is any combination of the first 12 embodiments, wherein the carbon black is 100% solid.

A 14th embodiment is any combination of the first 13 embodiments, wherein the second layer further comprises water in about 25% to about 30% by weight of the second layer.

A 15th embodiment is any combination of the first 14 embodiments, wherein the second layer further comprises an aqueous dispersion of an acrylic ester-styrene copolymer.

A 16th embodiment is any combination of the first 15 embodiments, wherein the fabric comprises a material selected from the group consisting of nylon, polyester, synthetic fibers, natural fibers and synthetic polymers.

What is claimed is:

1. A semiconductive tape comprising:

a first layer comprising a fabric;

a second layer in contact with the first layer, the second layer comprising a polymer and an activated carbon or carbon black, wherein the activated carbon or carbon black is about 6% to about 35% by weight of the second layer and an overall a solid content of the second layer is about 30% to about 60%; and wherein the polymer comprises an acrylic copolymer dispersed in water.

2. The tape of claim 1, wherein the second layer comprises carbon black.

3. The tape of claim 2, wherein the carbon black is hydrophobic.

4. The tape of claim 1, wherein the polymer comprises an electrically insulating material.

5. The tape of claim 1, further comprising a third layer comprising a polymer and an activated carbon or carbon black, wherein the first layer is positioned between the second and third layers.

6. The tape of claim 1, wherein the fabric comprises a material selected from the group consisting of nylon, polyester, synthetic fibers, natural fibers and synthetic polymers.

7. The tape of claim 1, wherein the overall solid content is about 45%.

8. The tape of claim 1, wherein the carbon black is about 24.5% by weight of the second layer.

9. The tape of claim 1, wherein the second layer further comprises water in about 25% to about 30% by weight of the second layer.

10. An electric cable comprising the tape of claim 1.

11. A semiconductive tape for use with an electrical cable, the tape comprising:

a fabric; and a polymer layer in contact with the fabric and comprising an activated carbon or carbon black, wherein the activated carbon or carbon black is about 6% to about 35% by weight of the second layer and an overall solid content of the second layer is about 30% to about 60%, wherein the polymer layer comprises an acrylic copolymer dispersed in water; and wherein the tape has a resistance of less than or equal to about 1 million (Ω/cm), and a coefficient of static friction of at least about 1.00.

12. The tape of claim 11, wherein the resistance is less than or equal to about 100 (Ω/cm).

13. The tape of claim 11, wherein the coefficient of static friction is at least about 1.25.

14. The tape of claim 11, wherein the coefficient of static friction is about 1.4 to about 1.5.

15. The tape of claim 11, wherein the tape has a coefficient of dynamic friction of at least about 0.7.

16. The tape of claim 15, wherein the coefficient of dynamic friction is at least about 0.8.

* * * * *